Oct. 17, 1933.  B. T. GIDDENS  1,931,222
LUBRICATION OF COMPRESSORS
Filed Feb. 13, 1929   2 Sheets-Sheet 1
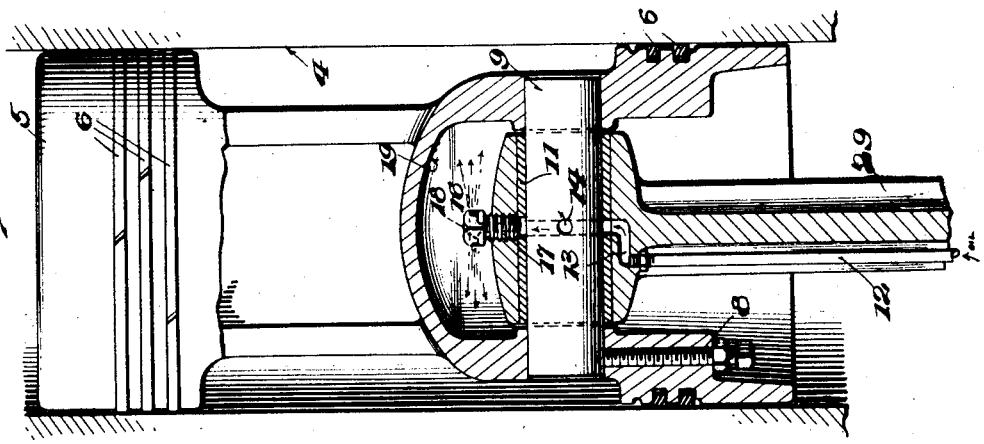
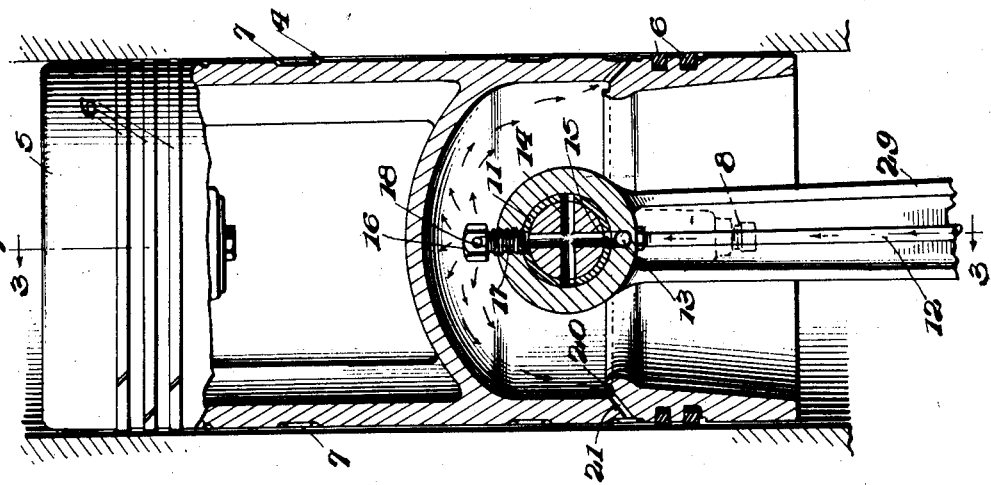
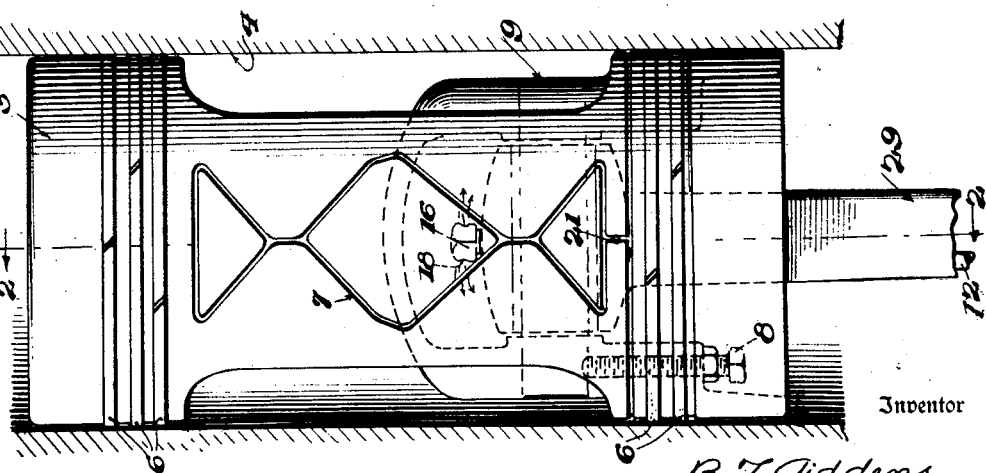
Inventor
B. T. Giddens
By Cameron, Kerkam and Sutton.
Attorneys

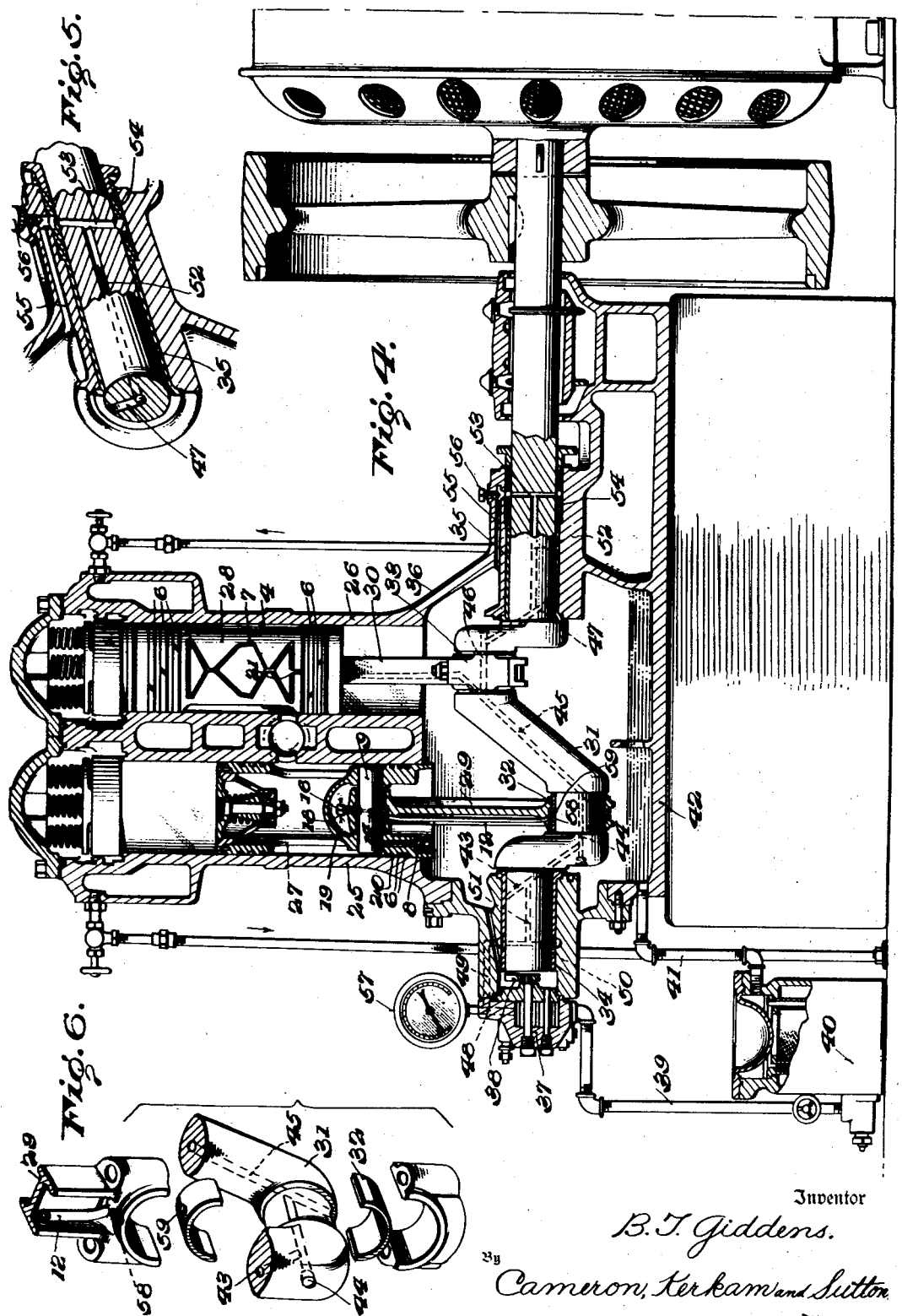

Patented Oct. 17, 1933

1,931,222

UNITED STATES PATENT OFFICE 1,931,222

LUBRICATION OF COMPRESSORS

Byron T. Giddens, Fountain City, Tenn.

Application February 13, 1929. Serial No. 339,629

3 Claims. (Cl. 184—18)

This invention relates to the lubrication of refrigerating machines, and particularly to the lubrication of the piston of the compressor and to the oil circulating system associated with the bearings of the compressor.

Considerable difficulty has heretofore been experienced in securing proper lubrication of the piston of the compressor. It has been proposed to introduce suitable quantities of lubricant into the refrigerant as it flows through the compressor, but experience has demonstrated that the lubricant may be carried through the compressor to a greater or less extent without proper lubrication of the cylinder walls, while sight feed devices for introducing the lubricant into the refrigerant require much attention.

To obviate this difficulty, it has been the practice to provide the compressor, at considerable expense, with external oil feed lines, but in addition to the expense of installation and other disadvantages of external pipe lines, the sight feed devices employed in conjunction with such systems have required much attention.

It is an object of this invention to provide means for adequately lubricating the piston of the compressor which is entirely self-contained within the compressor, thereby eliminating all external feed lines, sight feed devices, etc., and which by taking advantage in part of oil lines commonly provided within the compressor enables the lubrication to be effected at a minimum of cost.

Another object of this invention is to provide means for lubricating the piston of the compressor which cooperates with, and takes advantage of the pressure of the oil existing in an oil line for lubricating the wrist pin bearings, and which efficiently and effectively assures a copious supply of lubricant to the rubbing surfaces between the piston and cylinder.

It has heretofore been proposed to provide passages for conducting oil to the crank shaft and connecting rod bearings, but it has been customary to provide external pipe lines for leading the oil from the oil pump to various points of lubrication in the compressor.

Another object of the present invention is to supplement the oil passages associated with the crank shaft so as to eliminate the external piping heretofore employed, to the end that the lubricating system for the compressor may be entirely self-contained.

Another object of this invention is to provide, in an oil circulating system of the character last described, means for regulating the oil pressure so as to secure adequate lubrication of the bearing surfaces and eliminate the necessity for external sight feed devices.

Other objects will appear as the description of the invention proceeds.

The invention is capable of receiving a variety of mechanical expressions, one of which is shown on the accompanying drawings, but it is to be expressly understood that the drawings are for purposes of illustration only, and not to be construed as a definition of the limits of the invention, reference being had to the appended claims for that purpose.

In the drawings, wherein the same reference characters are employed to designate corresponding parts in the several figures, Fig. 1 is an elevation of the piston of a compressor embodying the present invention;

Fig. 2 is an axial section through the piston of Fig. 1, on the line 2—2 thereof;

Fig. 3 is an axial section through the piston of Fig. 1 at right angles to the section of Fig. 2;

Fig. 4 is an elevation, partly in section, of a known type of compressor for use in refrigerating apparatus and illustrating more or less schematically the oil circulating system which constitutes the second feature of the present invention;

Fig. 5 is an enlarged sectional detail showing the lubrication of the packing gland and the means for adjusting the oil pressure; and Fig. 6 is a perspective view of the component elements of the bearing between the crank shaft and connecting rod to illustrate how the feature of the invention illustrated in Figures 1 to 3 may be combined with the oil circulating system illustrated in Fig. 4.

Referring to Figs. 1, 2 and 3, 4 indicates diagrammatically the interior wall of the cylinder of a compressor of any suitable character, such as used in refrigerating apparatus, and 5 designates the piston of the compressor. Said piston may be of any suitable construction and provided with any suitable number, arrangement and construction of piston rings 6. In the form shown, the intervening surfaces of the piston are provided with suitably arranged oil grooves 7 to distribute the lubricant over the surface of engagement between the piston and cylinder, these grooves being supplied with lubricant, in accordance with the present invention, as next to be described.

Carried by the piston, and suitably retained therein as by the cap screw 8, is a wrist pin 9. The connecting rod 10 has the usual or any suitable bearing 11 on said wrist pin 9. It has heretofore been proposed to lubricate this wrist pin bearing by conducting oil thereto under pressure, as by mounting a pipe 12 on the connecting rod which communicates with one or more passages 13 in the sleeve of the wrist pin bearing, said passages communicating with passages 14 in the wrist pin, here shown as at right angles to each other and leading to the bearing surfaces, through apertures 15 in the bearing brasses. It is to be expressly understood that within this feature of the present invention the oil may be led to and distributed to the bearing surfaces of the wrist pin bearing in any suitable way, that illustrated being merely for purposes of exemplification.

In accordance with the present invention means are provided at the wrist pin bearing whereby the oil led to the wrist pin bearing is caused to be sprayed onto the inner wall of the piston and there collected in a suitable receptacle for supplying with lubricant the rubbing surfaces of the piston through suitably disposed apertures in the piston wall. It is usual to supply the oil to the wrist pin bearing at a pressure materially above that within the compressor and this pressure on the oil may be utilized to secure the effective spraying of the oil onto the inner wall of the piston, but if the usual oil pressure is inadequate, the pump pressure should be adjusted so that the pressure on the oil at the wrist pin bearing will be ten or fifteen pounds in excess of the back pressure on the refrigerant at the compressor—which usually runs from fifteen to thirty pounds per square inch.

While any suitable means may be utilized for spraying the oil from the wrist pin passages onto the inner wall of the cylinder, for simplicity and cheapness of construction, it is preferred to utilize the cap screw that is conventionally employed for holding the wrist pin brasses in position. As shown, cap screw 16 is provided with an axially extending passage 17 within its shank, this passage communicating with one or more cross passages 18 formed in its head. The passages in the wrist pin are so disposed that the oil flowing therethrough will intermittently lead directly into the oil passages in the cap screw 16, or the surface of the brasses may be grooved, if desired, so that there may be continuous communication between the wrist pin passages and said screw passages. Therefore, the oil under pressure as furnished to the wrist pin bearing is caused to flow under pressure through the passages in cap screw 16, and is sprayed from the outlet of said passages onto the inner wall 19 of the piston, as illustrated by the arrows in Figs. 2 and 3.

The oil sprayed onto the inner wall of the piston is collected in any suitable receptacle, preferably in the form of a groove 20 which extends throughout a major portion of or the entire circumference of the inner wall of the piston. The oil sprayed onto the piston wall runs down into the groove 20 and keeps this groove full of oil, any excess oil flowing over the inner edge of said groove and down the skirt of the piston to the crank case. From the groove 20 a suitable number of small passages 21 lead through the piston wall to the exterior rubbing surfaces thereof. Where the exterior surfaces of the piston are provided with oil grooves, as shown in Fig. 1, for example, said passages preferably communicate directly with said oil groove.

Therefore, it will be perceived that a copious supply of lubricant is furnished to the rubbing surfaces of the piston at all times, and this is effected without external oil circulating means, sight feed devices, or other accessories. By utilizing the pressure on the oil usually supplied to the wrist pin bearing and by forming the spraying passages in the cap screw conventionally employed at the wrist pin bearing, this lubrication is effected at a minimum cost, while at the same time the lubrication of the piston is entirely self-contained within the compressor, and experience has demonstrated that this lubrication is highly effective and efficient. While it has been presupposed that the wrist pin bearing has been provided with suitable passages and means for supplying oil thereto under pressure, it is to be understood that the invention is applicable to pistons not provided with such oil passages or cap screws or both, in which event it is within the contemplation of this invention to suitably provide the wrist pin with passages and lead oil thereto under appropriate pressure and in any suitable way, and through a cap screw provided with passages or any other suitable spraying device, cause the oil to be sprayed under pressure against the inner wall of the piston, collected and distributed as heretofore described.

Referring next to Figs. 4, 5 and 6, the heretofore described feature of this invention and the feature next to be described are shown as embodied in a known type of compressor for refrigerating apparatus, although it is to be expressly understood that the particular construction of compressor illustrated has been selected for purposes of exemplification only. The compressor shown has two cylinders 25 and 26 in which work pistons 27 and 28. Said pistons are connected by connecting rods 29 and 30 to a crank shaft 31 having crank pin bearings 32 and 33 and crank shaft bearings 34 and 35 in the walls of the compressor casing 36. An oil pump 37 of any suitable construction is driven in any suitable way as by gearing 38 from the crank shaft. The inlet 39 to said pump leads from a filter 40 of any suitable construction, the lubricant flowing to said filter 40 through pipe 41 from the crank casing 42 which contains a body of oil as conventional.

It has heretofore been proposed to provide the crank shaft with cored passages 43, 44, 45, 46 and 47 whereby oil may be introduced thereinto from the oil pump and thereby caused to flow to and lubricate the crank pin and crank shaft bearings heretofore referred to. Advantage is taken of this construction, in accordance with the present invention, although it is within the contemplation of this invention to provide such passages if they are not already formed in the crank shaft and bearings as heretofore described. But in accordance with the present invention, these passages are supplemented by additional passages whereby a complete and self-contained oil circulating system is formed, to the end that external piping and sight feed devices may be eliminated and a proper supply of lubricant under appropriate pressure may be furnished to all of the bearings.

To this end cored passages 48 and 49 are formed in the housing of the crank shaft bearing adjacent the oil pump, and communicate with the outlet of said pump, so that the oil is led directly to the crank shaft bearing 34 from the outlet of said pump. Said crank shaft bearing is provided with passages 50 and 51 whereby the oil so led to the crank shaft 34 is caused to flow to and through the oil passages 43, 44, 45, 46 and 47, as heretofore provided, thereby lubricating the bearings 32, 33 and 35. An additional passage 52 in the crank shaft bearing 35 communicates with the passage 47 and leads oil to a passage which in turn leads to and lubricates the packing gland 54. A cored passage 55 in the housing of crank shaft 35 communicates with the passage 53 and with the interior of the crank case. Hence the oil withdrawn from the crank case and passed through the filter 40 and pump 37 is caused to flow through the passages 48, 49, 50, 51, 43, 44, 45, 46, 47, 52, 53 and 55, returning to the crank case, thereby lubricating all of the crank shaft and crank pin bearings without any external oil piping.

In order to maintain a proper pressure on the oil so circulated, adjustable means are provided adjacent the outlet of said oil circulating system in order that the appropriate back pressure may be effected. In the form shown, a cap screw 56 is mounted in the housing of crank shaft bearing 35 so as to constrict the outlet from passage 53 into the passage 55. By suitably adjusting said screw the back pressure on the circulating oil may be closely adjusted to the desired value, and once this pressure is obtained, the desired circulation of oil will be maintained without the frequent inspection required of sight feed devices. The pressure may be indicated by a suitable gauge 57 in communication with the passage 48 leading from the pump outlet.

In the form shown, the wrist pin bearings are also supplied with lubricant by this same circulating system. The pipe 12 carried by the connecting rod leads at its inlet end from a passage 58 in the crank pin bearing 32, which in turn communicates through a passage 59 in the bearing brass with the passage 45 by which oil is led to said crank pin bearing. Thereby the oil under pressure is periodically forced through the pipe 12 to and through the wrist pin bearings, at each revolution of the crank shaft, although if desired the communication between the passages leading to the crank pin bearing and wrist pin bearing may be extended or made continuous by suitably grooving the brasses of said bearings. Thereby the first feature of the invention heretofore described may also be incorporated in a lubricating system of the character just described.

Therefore, it will be perceived that a lubricating system for the compressors of refrigerating apparatus has been provided which is self-contained and which therefore eliminates all external oil piping of the character heretofore employed. Also, it assures a copious supply of lubricant to all of the bearings and the supply can be maintained under any desired pressure. Furthermore, an oil circulating system in accordance with the present invention eliminates the use of sight feed devices and assures a constant and adequate supply of oil at the desired pressure once the adjusting screw has been set. Additionally, a system in accordance with the present invention may be readily combined with the means for properly lubricating the piston as heretofore described, and thereby all of the bearing surfaces of the compressor be effectively and efficiently lubricated without the costly external oil circulating lines and sight feed devices requiring constant attention on the part of an attendant.

While the embodiment of the invention illustrated on the drawings has been described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts, and certain features used with other features, without departing from the spirit of this invention. Reference is therefore to be had to the appended claims for a definition of the limits of the invention.

What is claimed is:

1. In a compressor for refrigerating apparatus, in combination with the piston, cylinder, connecting rod and wrist pin thereof, said connecting rod and wrist pin having passages for conveying oil under pressure to said wrist pin, a cap screw for holding the bearing brasses of the wrist pin and provided with a passage communicating with said first-named passages, means for collecting oil delivered by the passages of said cap screw, and means for conveying said oil to the rubbing surfaces of said piston.

2. In a compressor for refrigerating apparatus, in combination with the piston, cylinder, connecting rod and wrist pin thereof, said connecting rod and wrist pin having passages for conveying oil under pressure to said wrist pin, a cap screw provided with one or more passages communicating with said first-named passages and adapted to spray oil onto the inner surface of said piston, a receptacle into which the oil on the inner wall of said piston will run, and means for delivering said oil at a plurality of points to the rubbing surfaces of said piston.

3. In a compressor for refrigerating apparatus, in combination with the piston, cylinder, connecting rod and wrist pin thereof, said connecting rod and wrist pin having passages for conveying oil under pressure to said wrist pin, a cap screw provided with one or more passages communicating with said first-named passages for spraying oil onto the inner wall of said piston, a groove on said inner wall for collecting the sprayed oil, and passages through the wall of said piston at spaced points communicating with said groove, said groove acting as a reservoir to supply all of the passages with oil.

BYRON T. GIDDENS.